United States Patent [19]

Meyer et al.

[11] Patent Number: 4,462,739
[45] Date of Patent: Jul. 31, 1984

[54] DRY PULVERIZED SOLID MATERIAL PUMP

[75] Inventors: John W. Meyer, Palo Alto; John H. Bonin, Sunnyvale; Arnold D. Daniel, Jr., Alameda, all of Calif.

[73] Assignee: Lockheed Missiles & Space Co., Inc., Sunnyvale, Calif.

[21] Appl. No.: 363,539

[22] Filed: Mar. 30, 1982

[51] Int. Cl.³ .............................................. F23D 11/06
[52] U.S. Cl. ..................... 414/217; 406/71; 239/225; 239/380; 48/86 R; 415/90
[58] Field of Search ............... 414/217; 239/214, 225, 239/380; 406/71, 99; 415/90; 48/86 R

[56] References Cited

U.S. PATENT DOCUMENTS

| 1,013,248 | 1/1912 | Wilkinson | 415/90 |
| 2,490,066 | 12/1949 | Kollsman | 415/90 |
| 4,265,580 | 5/1981 | Meyer | 414/217 |
| 4,335,994 | 6/1982 | Gurth | 406/99 X |
| 4,347,033 | 8/1982 | Possell | 415/90 |
| 4,362,441 | 12/1982 | Meyer et al. | 414/217 X |
| 4,376,608 | 3/1983 | Meyer et al. | 414/217 |

FOREIGN PATENT DOCUMENTS 0770964 10/1980 U.S.S.R. ............................... 406/99

Primary Examiner—Robert J. Spar
Assistant Examiner—Ken Muncy
Attorney, Agent, or Firm—H. Donald Volk

[57] ABSTRACT

Apparatus is shown for substantially increasing the feed rate of pulverized material into a pressurized container. The apparatus includes a rotor that is mounted internal to the pressurized container. The pulverized material is fed into an annular chamber defined by the center of the rotor. A plurality of impellers are mounted within the annular chamber for imparting torque to the pulverized material.

2 Claims, 3 Drawing Figures

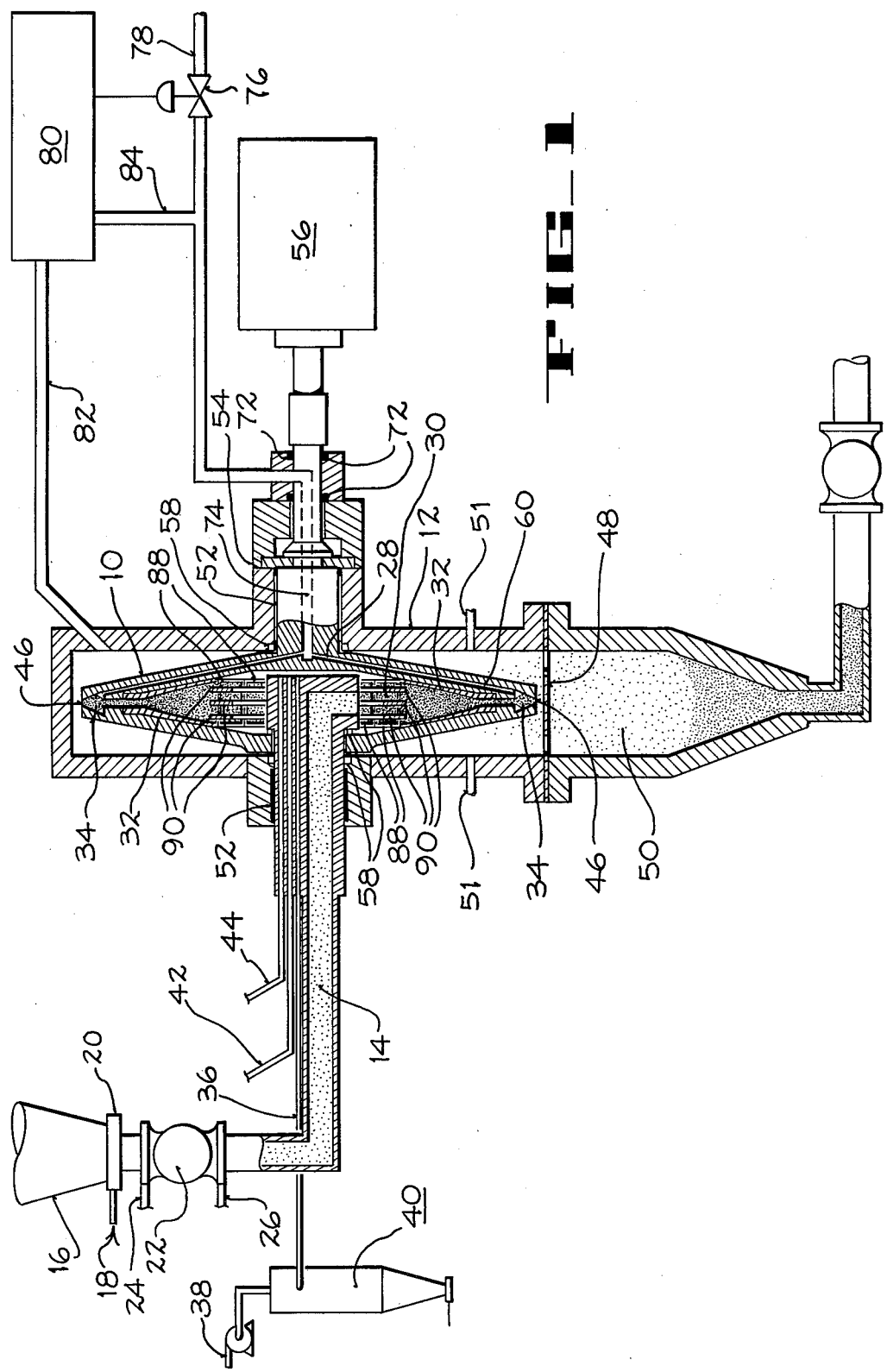
FIG_1

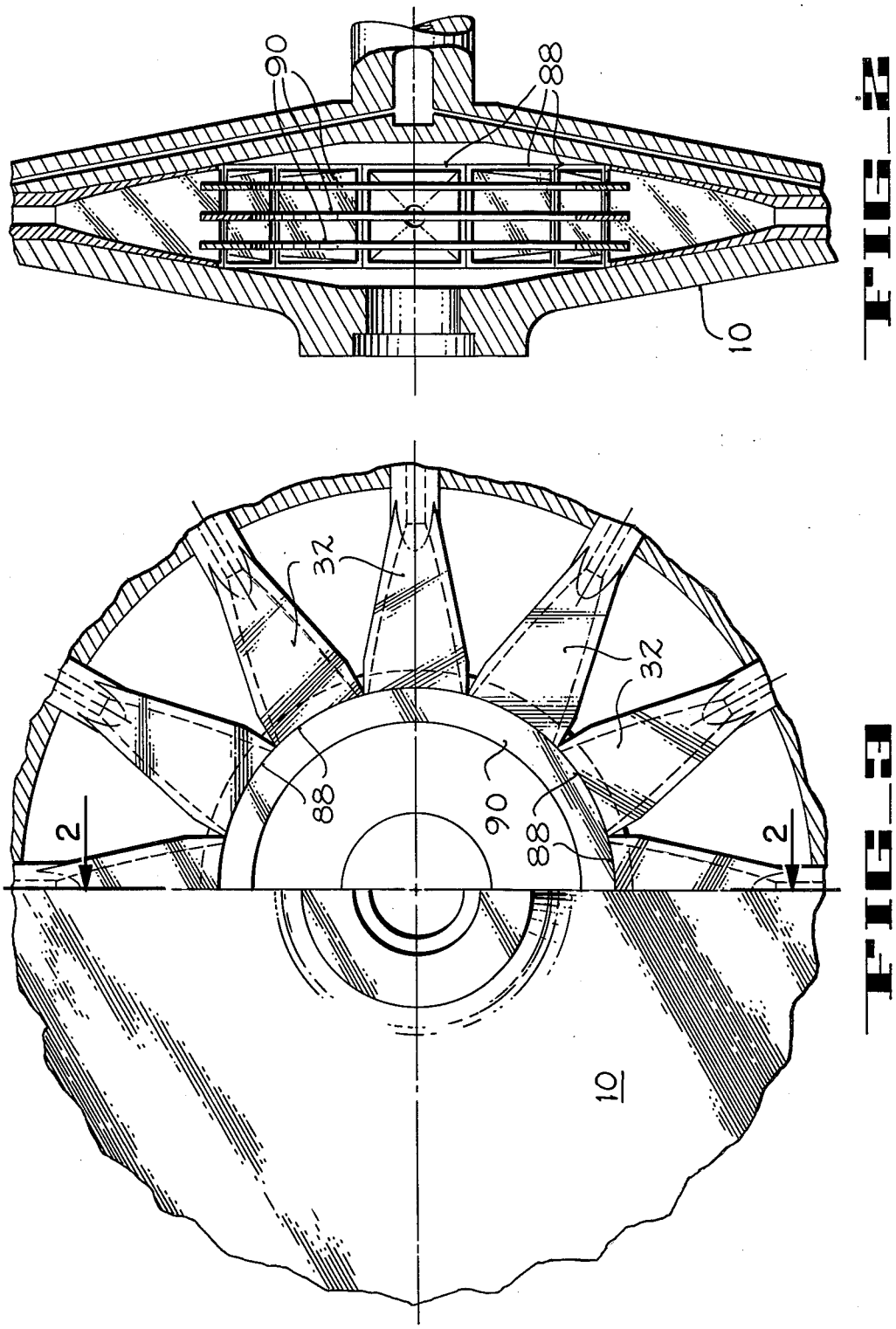

DRY PULVERIZED SOLID MATERIAL PUMP

TECHNICAL FIELD

The Government has rights in this invention pursuant to Contract No. 76-C-01-1792 awarded by the Department of Energy.

This invention relates to an improved device used for feeding pulverized material into processes operating at elevated gas pressure. One such industrial process, coal gasification, requires the feeding of pulverized or powdered coal to a high pressure reactor vessel from an atmospheric pressure hopper or the like. There are many types of coal gasification processes, utilizing a wide range of reactor pressure levels, but at the present time pressures of twenty to forty atmospheres are most common.

BACKGROUND ART

In co-pending U.S. patent application Ser. No. 32,646 entitled "The Kinetic Extruder—A Dry Pulverized Solid Material Pump", now abandoned assigned to the same assignee as the present patent application, it is noted that there are a number of industrial processes which require the feeding of particulate material from a lower atmospheric pressure environment to the elevated pressure environment within the working vessel.

The invention set forth in that patent application provides a method and apparatus for the continuous feeding of pulverized or powdered solid material such as coal to a pressurized vessel. This is achieved by the use of a rotor within a pressurized case through which the material is pumped into the vessel. The material is gas fluidized and pneumatically fed from an atmospheric feed hopper through a stationary feed pipe, then into a spin-up zone between a stationary inner hub and a rotatable driven rotor. Within the spin-up zone the material is defluidized and compacted into a packed bed as it is centrifugally driven outward and enters radial channels or sprues in the rotor. A porous compacted moving plug of material forms in the sprues and creates a seal against the high-pressure gases. The sealing action is a combined effect of both the motion of the plug and its relatively low permeability. A control nozzle structure at the distal end of the sprues stabilizes the moving material plug and controls its outward velocity to the proper value for effective sealing.

The spin-up zone is vented to a vacuum system to allow the removal of excess fluidizing gas which results from the compaction of the solids and also any small amount of gas leakage back through the compacted moving plug in the sprues from the high pressure vessel. A sub-atmospheric pressure is maintained in the spin-up zone in order to assure reliable feed from an atmospheric hopper.

In the apparatus described in the above-cited U.S. patent application Ser. No. 32,646 now abandoned the spin-up zone is an open annular area between the stationary inner hub containing the feed pipe outlet, and the plurality of the sprue inlets.

The same general spin-up zone structure is shown in U.S. Pat. No. 4,265,580 entitled "A System for Throttling and Compensating for Variable Feedstock Properties" and U.S. patent application Ser. No. 199,861, now U.S. Pat. No. 4,362,441, entitled "Means and Apparatus for Throttling a Dry Pulverized Solid Material Pump", both assigned to the same assignee as the present patent application.

It is important to recognize that the coal issuing from the feed pipe has no rotary motion, is fluidized with gas, and is of relatively low bulk density; i.e., 20–25 lbs/ft$^3$. On the other hand, the moving coal bed within the sprues is non-fluidized and is compacted to 40–50 lbs/ft$^3$ density, and rotates with the rotor. The spin-up zone is therefore a shear zone within which the incoming material is both accelerated to the requisite angular velocity and "settled" into a more compacted form, before entry into the sprues. The torque necessary to impart angular acceleration to the coal is applied by friction with the walls of the rotor as well as with the surface of the settled bed over the sprue inlets.

The spin-up zone of the prior applications is capable of handling a limited rate of flow of material. If the withdrawal rate through the sprues exceeds the critical value, there is insufficient spin-up and compaction of the coal and an adequate pressure sealing plug in the sprue cannot be formed. Attempts to run at higher throughputs resulted in "blowbacks" due to the loss of the integrity of the sprue plugs.

DISCLOSURE OF INVENTION

According to the present invention, the spin-up zone of a Kinetic Extruder rotor is fitted with additional blading. Use of impeller blading in this region more effectively imparts angular momentum to the in-flowing coal and thereby causes it to settle and compact more rapidly into the sprues. This allows the rotor spin-up zone and the rotor as a whole to be reduced in size and greatly improves the efficiency of the Kinetic Extruder pump.

BRIEF DESCRIPTION OF THE DRAWINGS

FIG. 1 is a partial vertical sectional view, with portions shown diagramatically, of the preferred embodiment of the invention.

FIG. 2 is a partial vertical sectional view of the preferred embodiment of the invention with portions broken away to show interior details; and FIG. 3 is a partial vertical sectional view of the preferred embodiment illustrated in FIG. 3 taken at a right angle to the FIG. 2 view.

BEST MODE FOR CARRYING OUT THE INVENTION

In FIG. 1 there is shown, for purposes of illustration, a partially schematic representation of an apparatus for the continuous feeding of pulverized or powdered solid material to a pressurized vessel.

In the illustrated embodiment, the material feeder includes a rotor 10 positioned within the pressurized rotor case 12. The exact configuration of the case is a matter of choice and design so long as the process gas pressure is maintained external to the rotor.

The material feeder includes a stationary feed pipe 14 for receiving material from a feed hopper 16. The feed hopper is fluidized in a conventional manner by gas injection 18 via a distribution plate 20 at the bottom of the solid bed. A normally open valve 22 may be positioned between the feed hopper and the stationary feed pipe 14. The valve 22 is used only during startup and shutdown of the machine. The feed pipe 14 is equipped with purge taps 24 and 26 on either side of valve 22 to clear any compacted solids from the pipe before start up and after shutdown.

The downstream end of the feed pipe comprises a non-rotating inner hub 28 in the rotor and contains a 90° bend in the feed tube to allow the solid material to enter the spin-up zone 30 in a radial direction.

The rotor 10 encloses the spin-up zone and inner hub and includes a number of radial flow channels each consisting of a sprue section 32 followed by a control nozzle section 34. The spin-up zone 30 comprises the annular space between the inner hub 28 and the entrance ends of the sprues.

The spin-up zone 30 is maintained at a lower gas pressure than the feed hopper pressure by vent tube 36, which is connected to a vacuum blower 38 through a dust filter 40, or any other well-known means for maintaining low pressure. The suction typically maintains a pressure of about $-2$ psig to $-5$ psig in the eye region of the rotor. This assures a continuous feed of material into the rotor from the atmospheric feed hopper. The type of flow through the feed pipe is known as dense phase pneumatic transport. The material is fluidized but is maintained at a relative high density, approximately 0.3 to 0.4 gms/cm$^3$ (20 to 25 lbs/ft$^3$), in comparison to the more common dilute phase pneumatic transport. This type of feed gives large mass fluxes with little transport gas and thereby minimizes the required diameter of the feed pipe.

Within the spin-up zone 30, the coal is accelerated to the rotor angular velocity and compacted to a density of 0.6 to 0.8 gms/cm$^3$ (40–50 lbs/ft$^3$) before entering sprues 32. The coal is non-fluidized in the sprues and flows therein as a porous compacted plug of granular solid material. The plug must be held in the sprue by an excess of centrifugal force over the gradient in gas pressure in the porous medium which tends to oppose the motion of the plug. Design of the sprue for favorable gas pressure distributions in the plug is rather complex but is thoroughly discussed in co-pending U.S. patent application Ser. No. 32,646, now abandoned, entitled "The Kinetic Extruder—A Dry Pulverized Solid Material Pump". The shaded areas in FIG. 1 indicate the portions of the machine which run filled with coal during feeding—light shading for low density fluidized coal, heavy shading for compacted coal. The compaction process in the spin-up zone produces gases which must be drawn out of vent 36 in order to maintain a low pressure in the eye of the rotor. The vent also removes any gases leaking through the sprue plug from the high pressure region.

Additional secondary channels communicating with the rotor eye region via the inner hub are a pressure tap 42 and a flushing gas line 44. In order to achieve mass flow variation (throttling) control gas is separately fed into the plurality of control nozzles 34 via a plurality of gas passages 74, 60 in the rotor. This control gas is fed into the rotor shaft via shaft seals 72 from supply pipe 78. Throttling is accomplished by varying the control gas pressure difference with respect to the gas pressure within the casing 12. The gas pressure is varied in a conventional manner via control valve 76 and differential pressure controller 80 which is connected to the casing and control gas pipeline via pressure taps 82 and 84.

Coal exits the rotor through a plurality of control nozzle outlet holes 46 into the pressurized rotor case. Surrounding the rotor during operation is a dilute suspension of solids. A vortex is set up in the case by the spinning rotor and during feeding the solids rapidly drift radially outward and through the slotted baffle 48, into an accumulator section 50 making up the lower portion of the case. Therein the solids may be settled and transferred via a conventional pneumatic pick-up system, or other means, to a reactor or another high pressure hopper. Pressurizing gas is fed into the case 12 at port 51 from any conventional supply.

The rotor is supported on shaft bearings 52 and thrust bearing 54 and driven by drive motor 56, or any other conventional drive means. The rotating seals 58 seal the rotor shaft and feed pipe inside and outside the rotor.

As previously indicated, the annular area between the stationary inner hub 28 containing the feed pipe outlet and the sprue inlets 88 define the spin-up zone. It is important to recognize that the coal issuing from the feed pipe has no rotary motion, is fluidized with gas, and is of relatively low bulk density (20–25 lbs/ft$^3$). On the other hand, the moving coal bed within the sprues is non-fluidized and is compacted to 40–50 lbs/ft$^3$ density, and rotates with the rotor. The spin-up zone is therefore a shear zone within which the incoming material is both accelerated to the requisite angular velocity and "settled" into a more compacted form, before entry into the sprues. The torque necessary to impart angular acceleration to the coal is applied by friction with the walls of the rotor as well as with the surface of the settled bed over the sprue inlets.

The prior inventions set forth in co-pending patent application Ser. Nos. 32,646, now abandoned, 199,861, now U.S. Pat. No. 4,362,441 and 32,651, now U.S. Pat. No. 4,265,580, discussed above performed their intended function well but are limited on the amount of pulverized material they are capable of handling. The limiting factor is the shape of the spin-up zone. Each spin-up zone is only capable of handling a certain mass flow rate, $m_{crit}$, of material. If the withdrawal rate through the sprues exceeds the critical value, there is insufficient spin-up and compaction of the pulverized material and an adequate pressure sealing plug in the sprue cannot be formed. Attempts to run at higher throughputs resulted in "blowbacks" due to the loss of the integrity of the sprue plugs.

The critical value of the mass flow, $m_{crit}$, is approximately proportional to the total "wetted area" of the rotating surfaces enclosing the spin-up zone, that is, the area of the settled bed surface plus the wetted rotor walls. One way to increase the spin-up zone critical flow rate is to increase the total rotating wetted surface area that the incoming pulverized material is exposed to. Design studies show that in small scale (i.e., feeding one to six tons of pulverized material per hour) the impellerless spin-up zone configuration, as used in the previous applications, is acceptable. However, in large scale applications (i.e., feeding fifty tons of pulverized material per hour), there is insufficient wetted area unless the spin-up zone is made impractically large.

The present invention is a spin-up zone configuration with an impeller structure 90 which increases the wetted area of the spin-up zone without increasing its overall size or the diameter of the rotor. Since the parasite skin drag on the perimeter of the rotor is substantial and is proportional to the fifth power of the diameter of the rotor, there is a strong efficiency payoff in reducing the rotor size. In this design the impeller blading consists of one or more flat rings which are attached to the rotor at the sprue inlets. Such rings add to the rotating wetted surface area and hence to the critical mass flowrate ($m_{crit}$) that can be handled. The impeller rings impart torque to the pulverized material by boundary layer friction in the same manner as the enclosing rotor walls. However, the total rubbing surface area between the pulverized material is increased in proportion to the number of such rings used. The applicable torque and mass flow rate also increase in the same proportion.

FIG. 2 shows a partial vertical sectional view of a Kinetic Extruder rotor 10 separated from its casing 12 and with its drive shaft 52 and inner hub 28 removed. FIG. 3 gives the opposite vertical sectional view of the rotor. As shown, the spin-up zone impeller blading 90 is juxtaposed to the plurality of inlets 88 which form the entrances of sprue channels 32. In this example, blading 90 consists of 3 flattened ring shapes which are locked to the rotor by partial extent into sprue channels 32. Such rings form a stack of narrowly spaced passages through which the pulverized material is slung radially outward by friction with the passage walls. The rings must be split in two or more sections for assembly. Alternate types of blading and assembly arrangements are, of course, possible.

The structure described herein is presently considered to be preferred; however, it is contemplated that further variations and modifications within the purview of those skilled in the art can be made herein. The following claims are intended to cover all such variations and modifications as fall within the true spirit and scope of the invention.

We claim:

1. Apparatus for continuous feeding pulverized material into a high pressure container, said apparatus including a stationary feed pipe for feeding the pulverized material into the high pressure housing, a rotor mounted concentric with the end of the stationary feed pipe for receiving the pulverized material, said rotor including a plurality of radial flow channels, each of said radial flow channels including a sprue section and a control nozzle section, the feed pipe and the rotor defining an annular spin-up chamber and wherein the improvement comprises at least one impeller mounted on the rotor and projecting into the annular spin-up chamber for imparting torque to the pulverized material.

2. The apparatus of claim 1 wherein said impeller is ring shaped.

* * * * *